Figure 11:
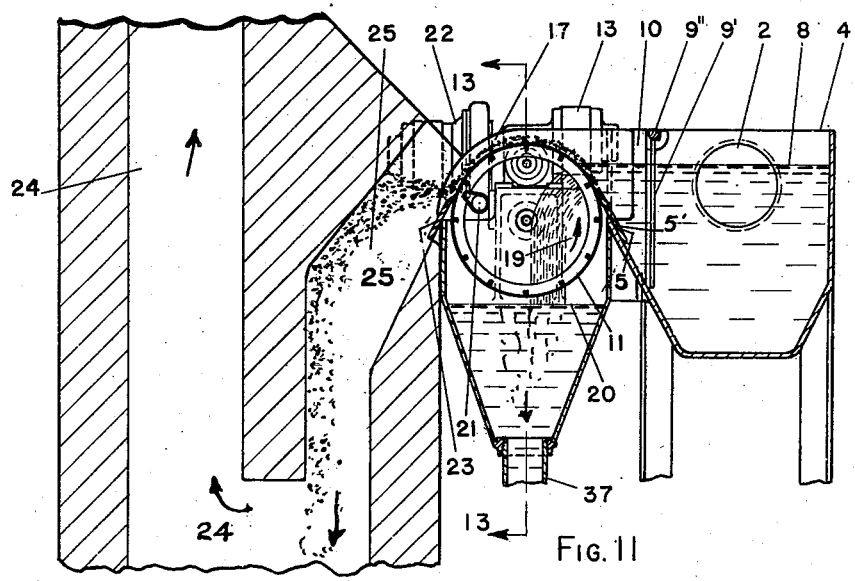

Feb. 23, 1943.   C. G. HAWLEY   2,311,830
WATER PURIFICATION
Filed March 16, 1939   11 Sheets-Sheet 1
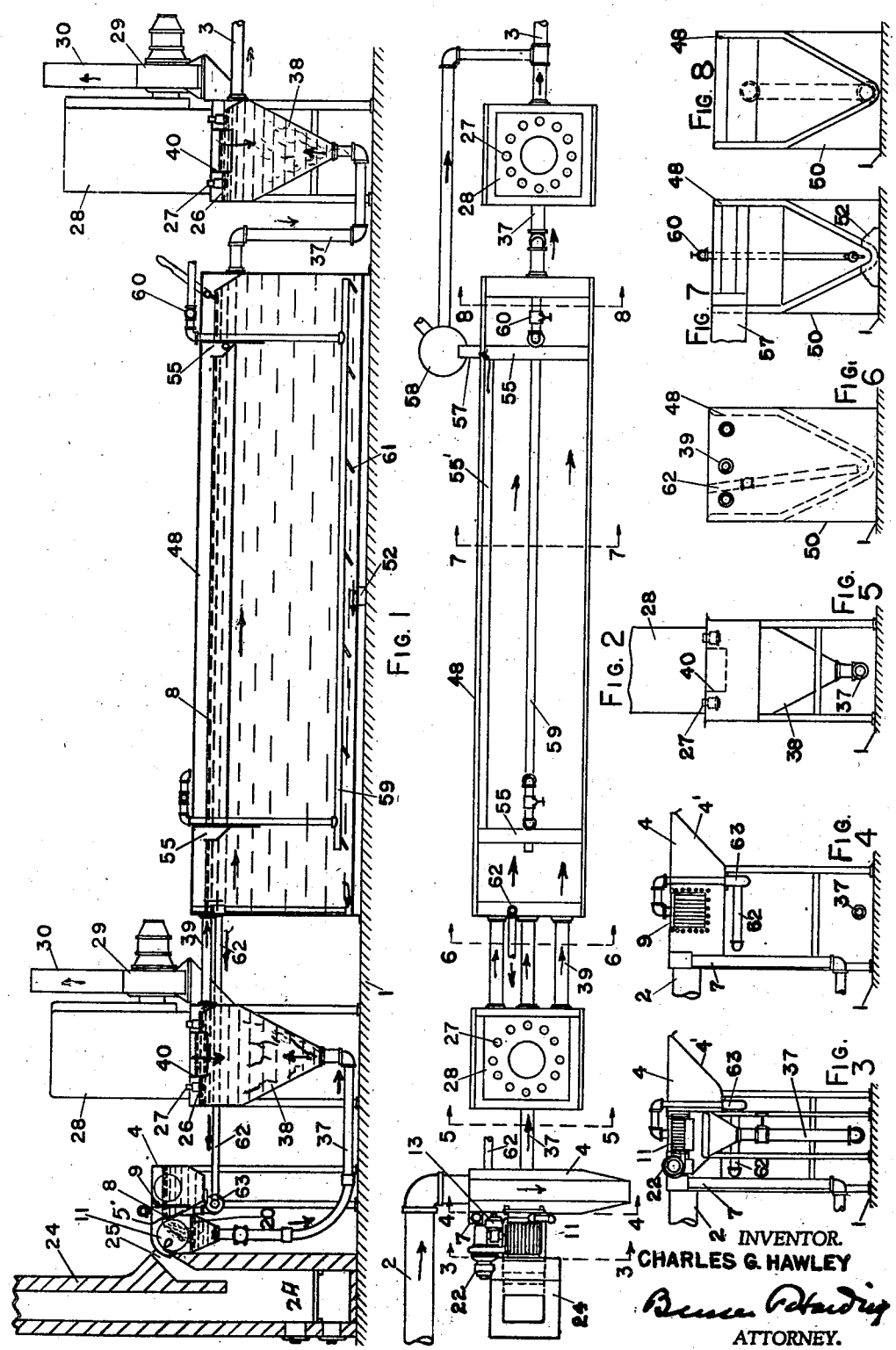
INVENTOR.
CHARLES G. HAWLEY
ATTORNEY.

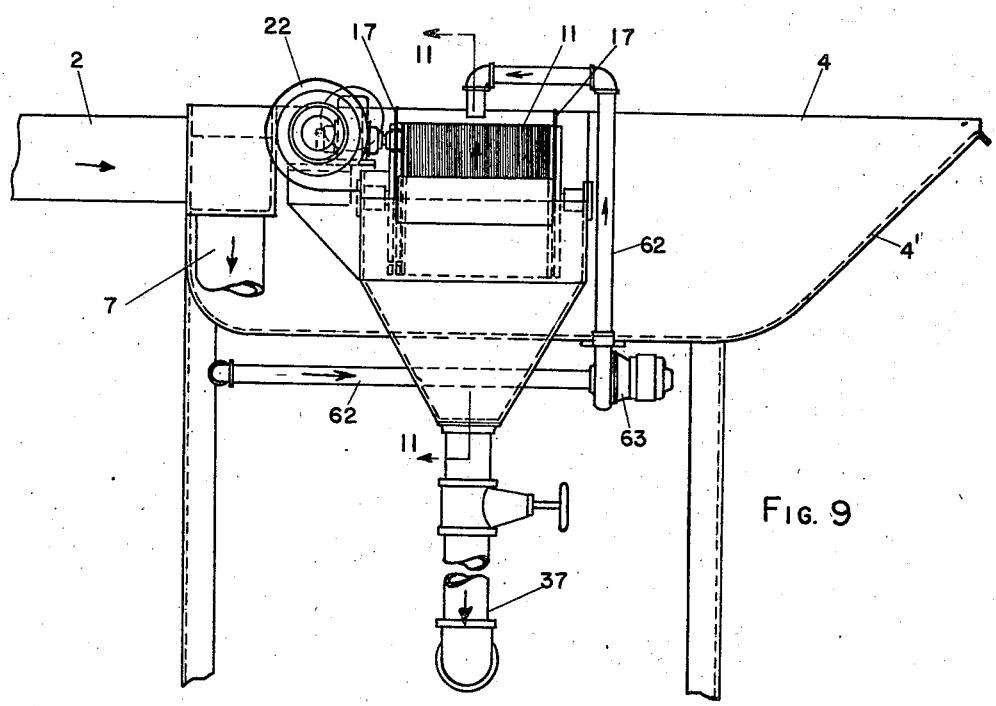
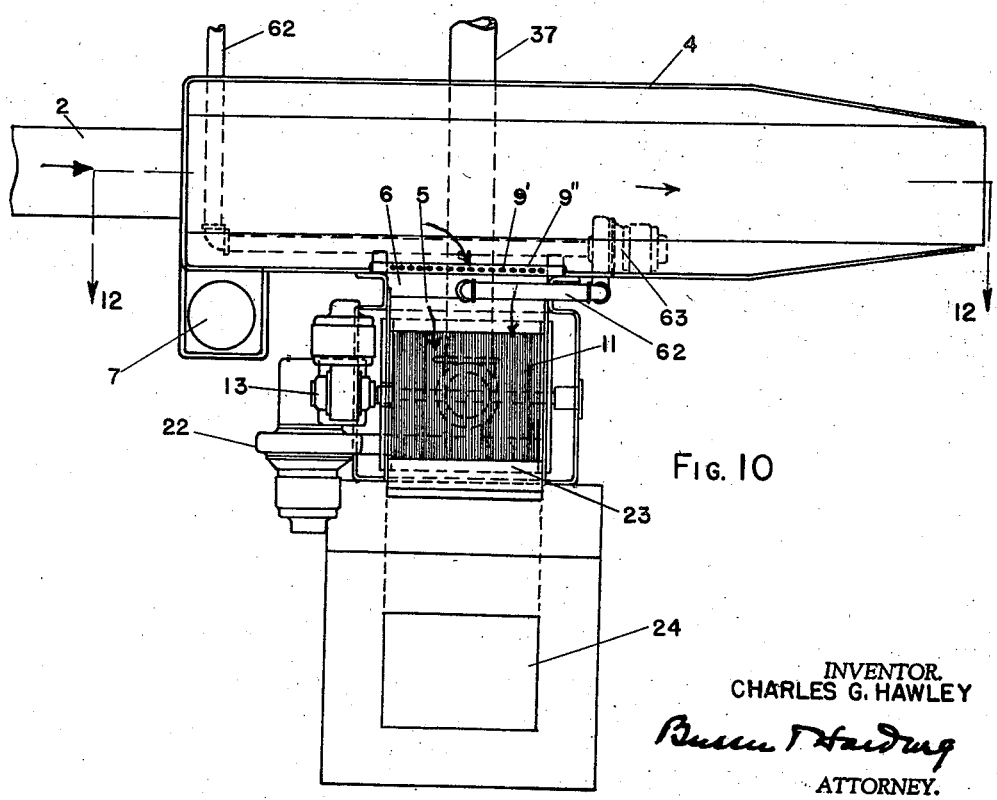

Feb. 23, 1943.   C. G. HAWLEY   2,311,830
WATER PURIFICATION
Filed March 16, 1939   11 Sheets-Sheet 3

INVENTOR.
CHARLES G. HAWLEY
BY
ATTORNEY.

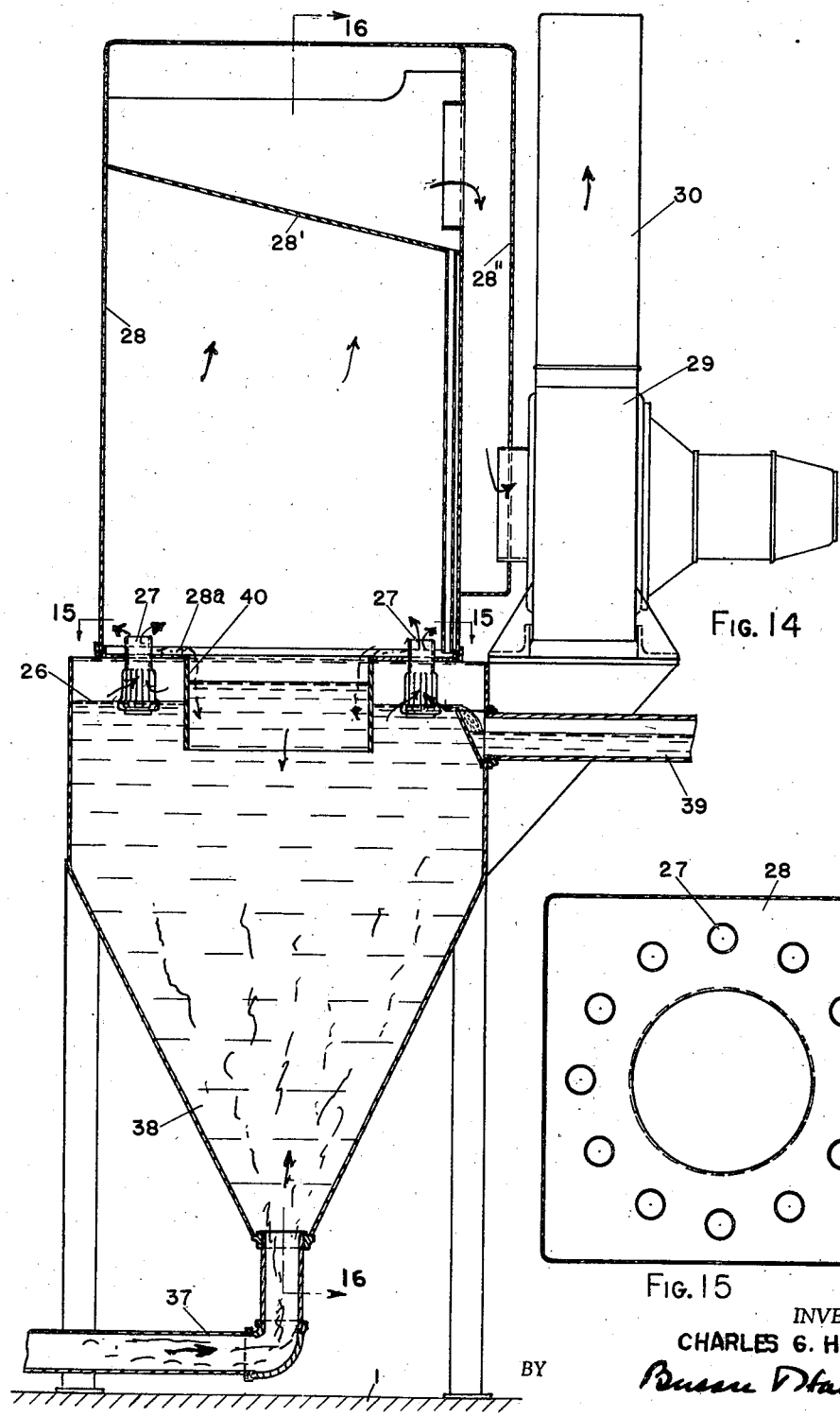

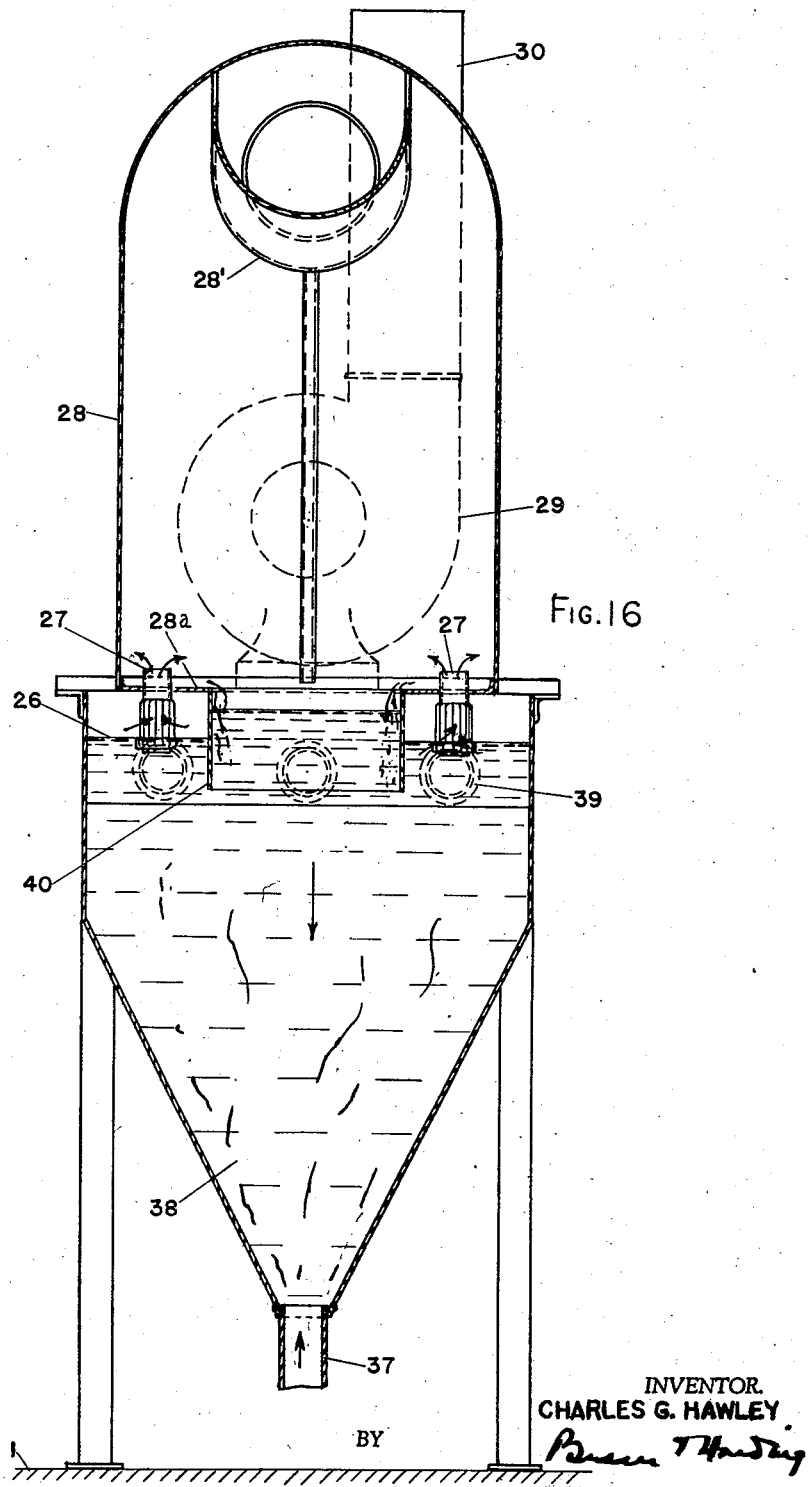

Feb. 23, 1943. C. G. HAWLEY 2,311,830
WATER PURIFICATION
Filed March 16, 1939 11 Sheets-Sheet 6
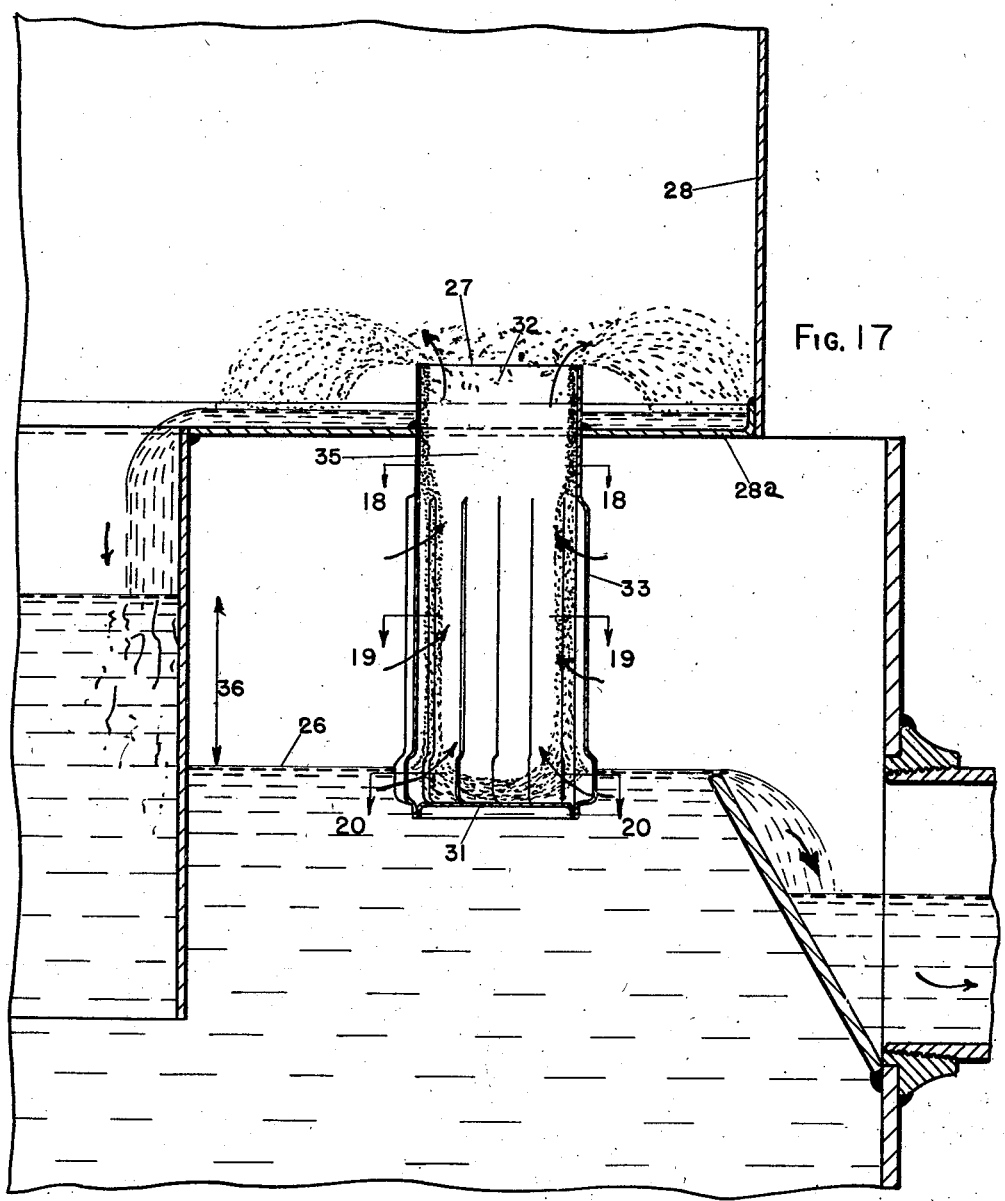
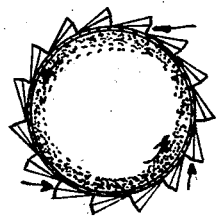
FIG 18
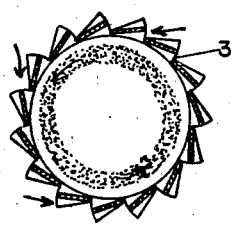
FIG. 19
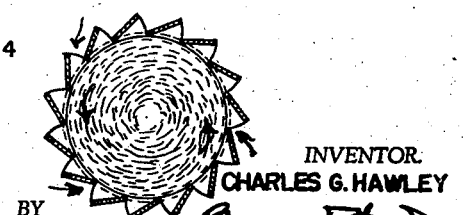
FIG. 20
INVENTOR.
CHARLES G. HAWLEY
BY
ATTORNEY.

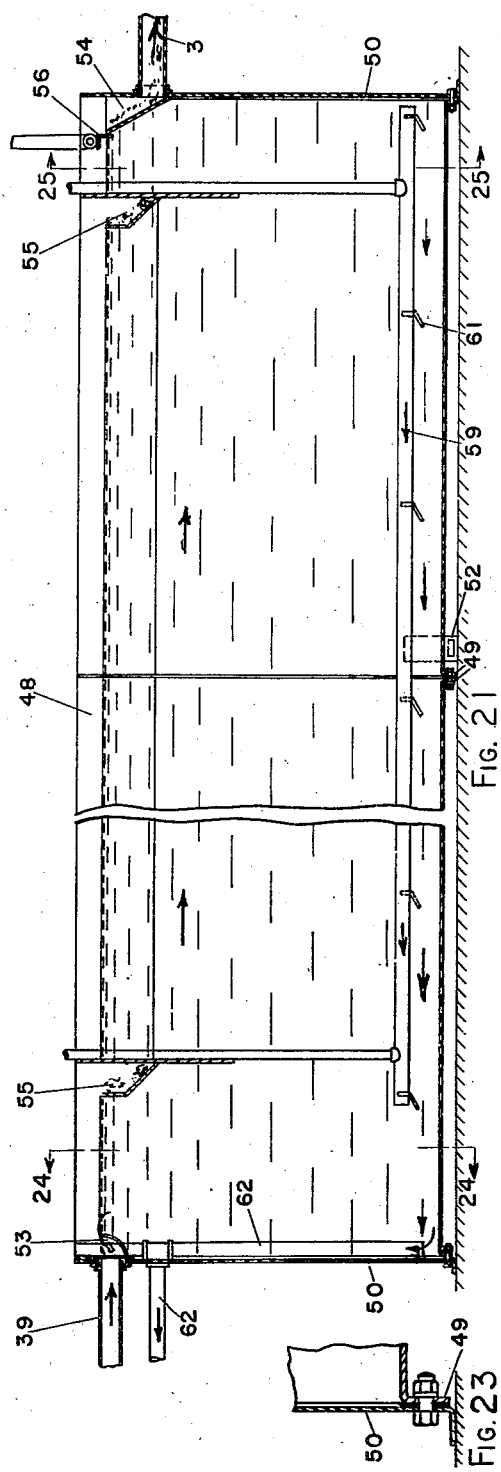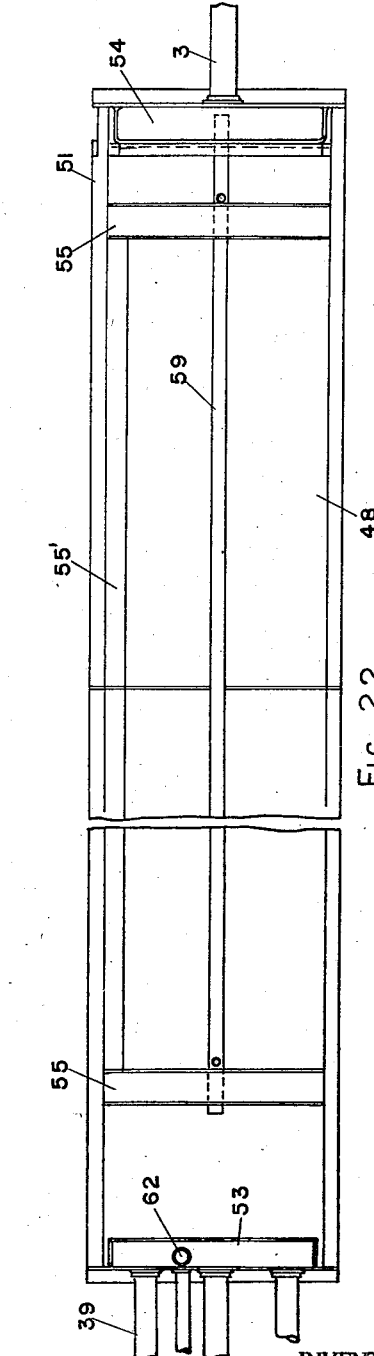

Feb. 23, 1943.  C. G. HAWLEY  2,311,830
WATER PURIFICATION
Filed March 16, 1939   11 Sheets-Sheet 8

INVENTOR.
CHARLES G. HAWLEY
BY
ATTORNEY.

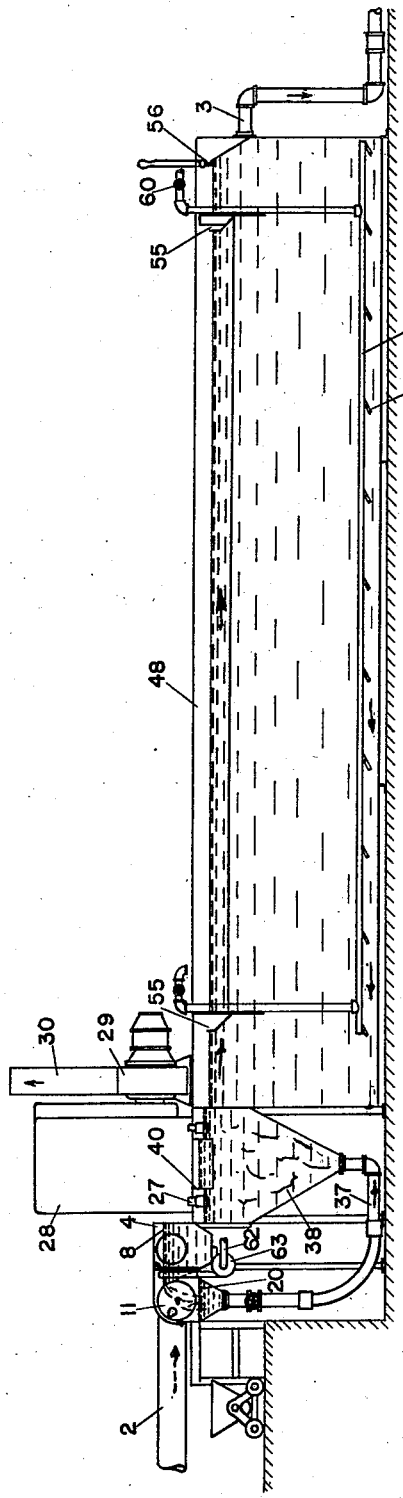

Feb. 23, 1943.  C. G. HAWLEY  2,311,830
WATER PURIFICATION
Filed March 16, 1939  11 Sheets-Sheet 10
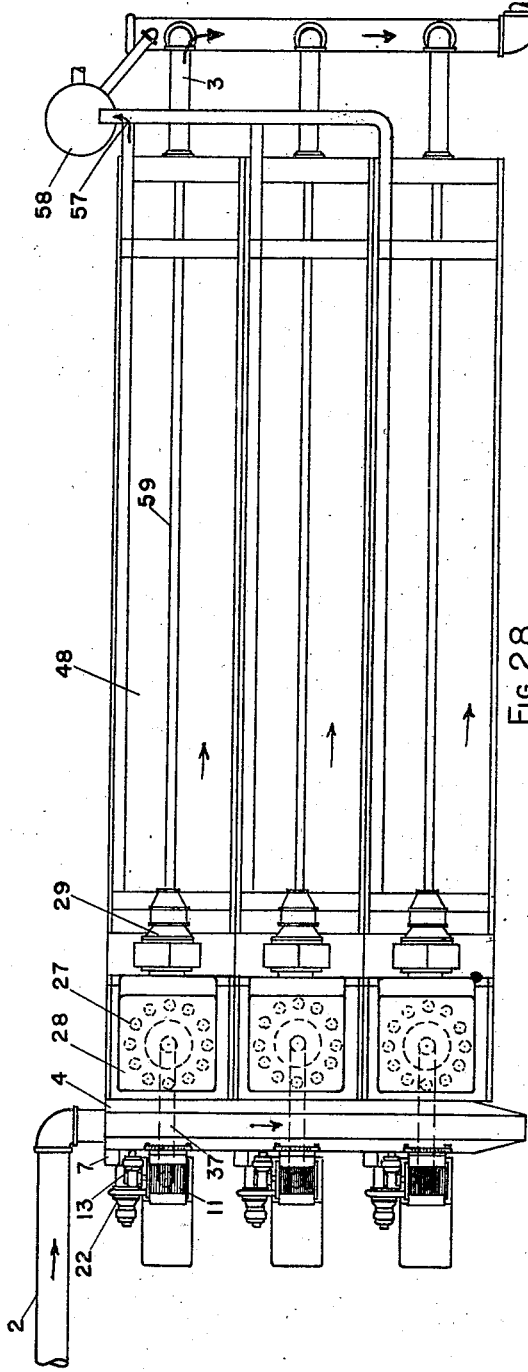
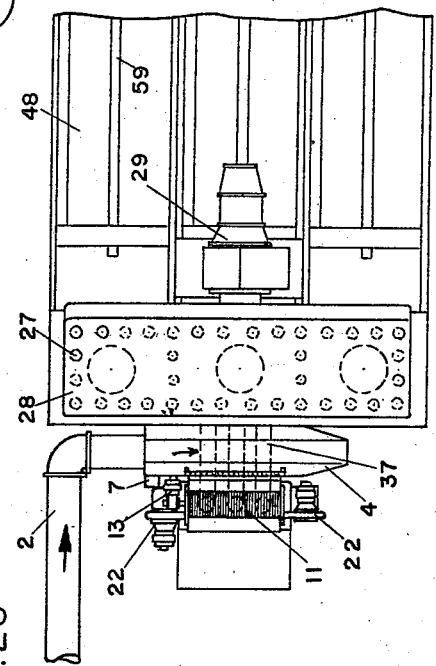
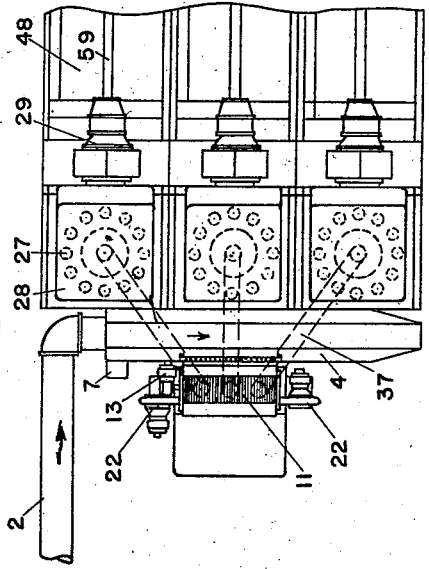
INVENTOR.
CHARLES G. HAWLEY
BY
ATTORNEY.

Feb. 23, 1943.   C. G. HAWLEY   2,311,830
WATER PURIFICATION
Filed March 16, 1939   11 Sheets—Sheet 11

INVENTOR.
CHARLES G. HAWLEY
BY
ATTORNEY.

Patented Feb. 23, 1943

2,311,830

UNITED STATES PATENT OFFICE 2,311,830

WATER PURIFICATION

Charles Gilbert Hawley, Cleveland, Ohio; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application March 16, 1939, Serial No. 262,141

2 Claims. (Cl. 118—8)

The invention relates to the purification of municipal and industrial waters. Two phases are to be considered. The first has to do with the preparation of water for domestic use; the second, with the purification or rectification of water after it has become sewage and before it can be safely returned to any source of domestic water. The present invention suits both purposes. Procedures are the same and the apparatus here provided serves one purpose as well as the other.

The primary object of this invention is to forcibly impose purity upon flowing water by mechanical operations thereon, and, to avoid the variables of, and dependence upon, the slow processes of nature. A further object of the invention is to provide sewage treatment apparatus in a readily transportable and installable form of such low cost as to encourage a general improvement in public waters. Still other objects of the invention will appear hereinafter.

In contrast with the extended purification processes of the past, the present invention takes the form of an abbreviated unitary machine which in lieu of permissive natural actions imposes radical conditions that expedite and ensure the prompt purification of the water, thus enabling the work to be done within a minimum of time, space and cost.

As will appear, mechanical filtration here conditions the polluted water for immediate completion. Next, the polluted water is finely subdivided in the presence of abundant air and is thus charged with oxygen to an extent which ensures ultimate stability and precludes subsequent putrefaction. A contact period and sedimentation then follow, affording a clear and clean effluent. The process is ended by the return of the settled sludge to the mechanical filter. The filter cake is burned.

Because of its direct action, the invention lends itself to simplification, and at low cost admits of a degree of perfection not hitherto attainable except at high cost. The machine as a whole and as here presented comprises a sequence of standardized metal units adapted to quantity production and readily arrangeable in the order and number needed to afford requisite capacities and end results.

Figure 12:
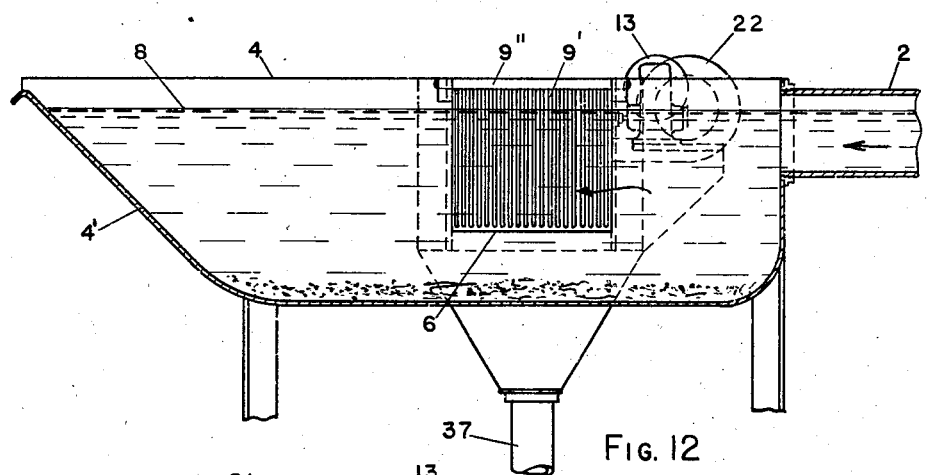
Figure 13:
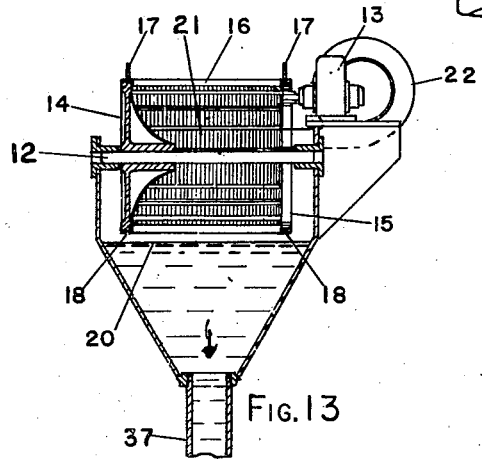
Figure 25:
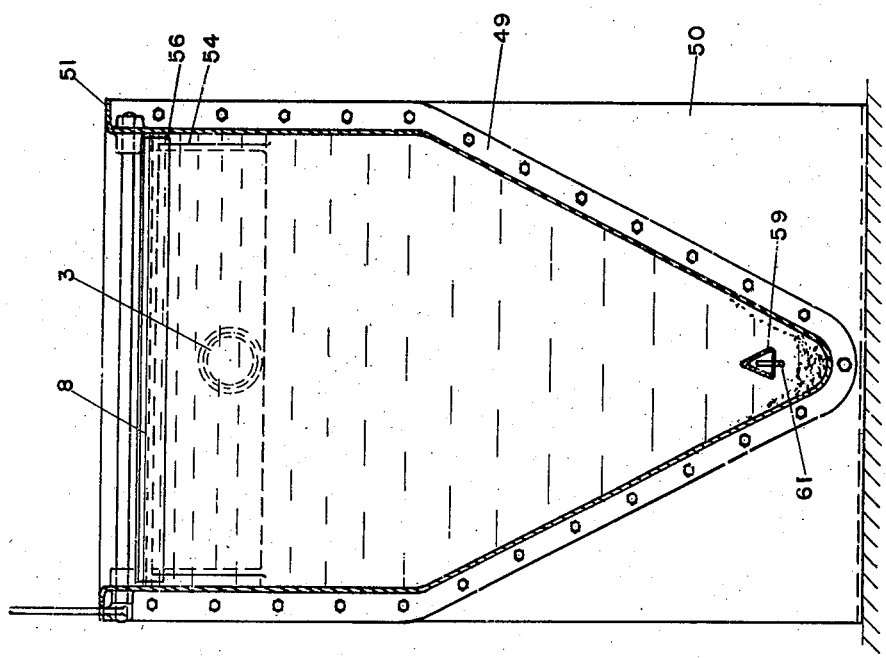
Figure 24:
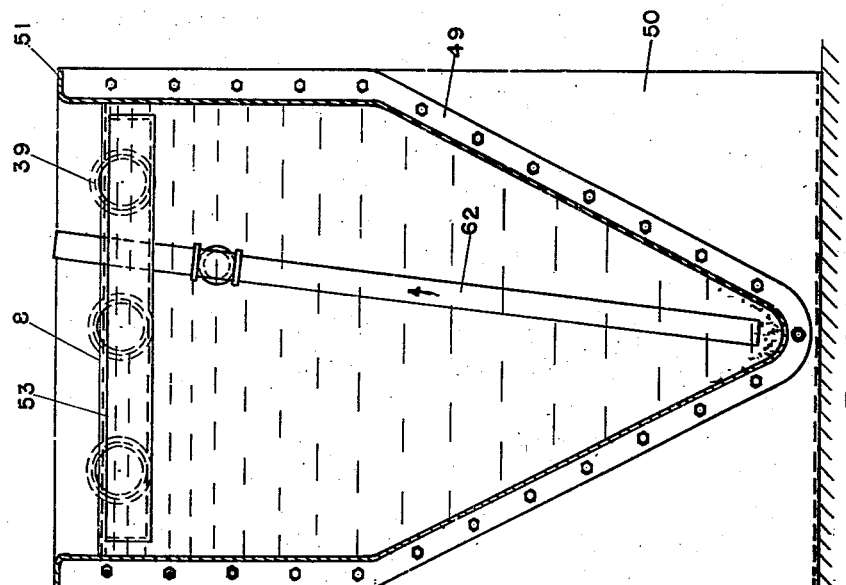

The invention will be readily understood upon reference to the accompanying drawings, in which Fig. 1 is a diagrammatic sectional elevation of a water purification system embodying the present invention; Fig. 2 is a plan view thereof; Fig. 3 is an end elevation taken from the line 3—3 of Fig. 2; Fig. 4 is a sectional view on the line 4—4 of Fig. 2; Fig. 5 is a sectional view on the line 5—5 of Fig. 2; Fig. 6 is a sectional view on the line 6—6 of Fig. 2; Fig. 7 is a sectional view on the line 7—7 of Fig. 2; Fig. 8 is a sectional view on the line 8—8 of Fig. 2; Fig. 9 is an enlarged end elevation of the trash trap and the associated filter or screen; Fig. 10 is a plan view taken from Fig. 9; Fig. 11 is a sectional view on the line 11—11 of Fig. 9; Fig. 12 is a horizontal section on the line 12—12 of Fig. 10; Fig. 13 is a vertical section on the line 13—13 of Fig. 11; Fig. 14 is a sectional view of the aeration unit or component of the machine; Fig. 15 is a sectional view on the line 15—15 of Fig. 14; Fig. 16 is a sectional view on the line 16—16 of Fig. 14; Fig. 17 is an enlarged sectional detail illustrating the functioning of an aeration unit; Fig. 18 is a sectional view on the line 18—18 of Fig. 17; Fig. 19 is a sectional view on the line 19—19 of Fig. 17; Fig. 20 is a sectional view on the line 20—20 of Fig. 17; Fig. 21 is a sectional elevation of the sedimentation tank; Fig. 22 is a plan view thereof; Fig. 23 is a sectional detail of the tank end; Fig. 24 is a sectional end elevation of the tank on the line 24—24 of Fig. 21; Fig. 25 is a sectional view on the line 25—25 of Fig. 21; Fig. 26 is like unto Fig. 1 but shows the components or units closely assembled or associated; Fig. 27 is a plan view taken from Fig. 26; Fig. 28 illustrates the invention in multiple form; Fig. 29 illustrates a modified arrangement of multiple units; Fig. 30 is still another arrangement thereof; and Figs. 31, 32, 33 and 34 illustrate special applications of the invention suited to different purposes.

The invention here presented is adapted for embodiment upon any scale and in any size which may be required and may be used as a substitute for and to supplement existing water purification systems; indeed, its general applicability and scope are to be understood as applying to the most extensive operations.

But on the other hand it is to be understood that the special purpose of the present invention is to simplify procedures and reduce costs of water purification to an extent which will enable even the poorer communities and industries to safeguard themselves and neighbors.

With that special object in view, Figs. 1 and 2 and Figs. 26 and 27 illustrate the invention as a typical sewage disposal unit suited to a town of approximately 1,000 population. The revolutionary character of the invention will be recognized in its small size and obvious low cost, particularly when it is further understood that the plant illustrated is less than fifty feet long, only six feet in depth, affords a detention period of not over one hour and yet accomplishes an almost perfect purification of domestic sewage at the rate of approximately one hundred thousand gallons per day.

Such a simple and yet complete unitary apparatus comprises a sequence of self-contained, all metal components or parts, each performing a definite function and each dependent upon another, as will be explained. By preference, all components are arranged upon a single level or foundation 1. The sewage enters the system from the influent channel 2, and, flowing from end to end under a slight hydraulic head, departs through an outfall 3.

The component parts will be best understood if separately explained, for each has a definite function to perform, each in relation to succeeding parts.

The trash trap

A shallow metal trough 4, elevated above the level 1, receives the sewage from the influent 2. The liquid leaves the trap through an elevated weir 5, beyond an extensive opening 6 in the side of the trough. An overflow 7, leading from the upper part of the trough controls the liquid level 8 therein.

The capacity of the trough is small, the purpose being to maintain turbulence and yet allow grit to settle to the bottom of the trough, for later disposal along with floating trash which may be caught in the trap. Such trash is entrapped by a bar screen 9 which occupies the opening 6. That screen is of peculiar construction. It comprises a number of parallel rods or tines 9' which hang from a cross bar 9'', attached to the side of the trough above the level 8. The tines 9' are of less depth than the trough, terminating well short of the bottom of the trough; in other words, the lower ends of the bars 9' open directly into the lower part of the trough. Such a bar screen is kept substantially clear by the sweep of the sewage across it and by the manual manipulation of a comb or brush in the hands of a workman. The trash is left in the trap, to be scraped out over the inclined end 4' thereof. The bar screen is readily removable as a whole, being swung upon pivots, at the top. It stands inward from the side of the trap, to facilitate cleaning. (See Figs. 10 to 12.)

The filter or screen

A screen pocket 10 is applied to the opening 6 in the side of the trash trap 4, and the liquid having passed through the bar screen 9, flows out over the weir 5, and there immediately encounters a much finer screen 11, which latter, functions to abstract all matters which might clog or block subsequent operations of the system.

The screen is of cylindrical form, with a central shaft 12, and is slowly rotated upon a horizontal axis, as by a suitably geared motor 13.

The screen is of peculiarly simple construction, comprising a skeleton-like cage formed by end rings 14 and 15 and cross bars 16 and a wrapping of wire. The wire is spirally wound upon the cage and the wraps of wire are close together. In practice, a wire of $\frac{1}{32}$" diameter is used and the spacing between wraps is still smaller, affording an extremely fine screen surface, interrupted only by the infrequent cross bars 16.

As well illustrated in Figs. 9 to 13, the top of the screen rises above the trough level 8 and above the weir 5. The weir 5 is formed by a flexible flap or extension 5' on the screen pocket and is normally pressed against the smooth wire face of the screen by the weight of the water in the trough. The flap 5' extends from end to end of the cylindrical screen and leakage is negligible. So-called cheek plates 17 are extensions of the sides of the opening 6, and ride in slots 18 provided therefor in the end rings, preventing leakage over the ends of the screen.

The screen rises behind the flap 5' in the direction of the arrow 19 in Fig. 11, and the rotation of the screen obviously serves to lift screenings from and over the liquid surface 8 which is maintained in the trough 4.

Falling through the top of the screen, the liquid escapes through the bottom of the screen, washing the wire at that point. It will be noted that the liquid level 20, which is maintained in the screen pocket, is below the bottom of the screen and that the wire is constantly washed by the falling water.

Obviously, the matters which are caught upon the wire face of the screen are slowly carried across the top of the screen, draining thereon and for delivery upon the opposite side of the screen. Such delivery is rendered positive and the screen is finally cleaned by a blast of air directed outward from the interior of the screen.

One end of the screen is open (see Figs. 9 to 13) and a fixed nozzle 21, served by a motor driven fan 22 and coacting with a parting strip 23 directs a sharp blast of air through the wire face of the screen, effectively cleaning the same.

Thus formed and equipped, the screen functions continuously without clogging and without care. And, a screen rotation of two to four revolutions per minute is amply fast to take care of the heaviest sewage.

Referring now to the left hand end of Figs. 1 and 11, it will be noted that a deep furnace stack 24 rises adjacent the screen and presents a fuel and air throat 25 directly opposite the screen blast nozzle 21. An ignition fire is maintained in the lower part of the stack and the high temperature therein serves to evaporate the small quantity of water which accompanies the screenings blown from the screen. The screenings are well drained upon the exposed top of the screen, leaving a minimum of moisture for evaporation in the furnace.

The moisture leaves the furnace stack in the form of steam while the dried solids burn in suspension in the lower part of the furnace stack, the operation continuing automatically as long as an ignition temperature is maintained in the lower part of the furnace.

By preferance, the cross sectional area of the throat 25 is closely limited to avoid an excess of air. Suitable air feeding openings are provided in the lower part of the furnace and the regulation of the combustion described is easily accomplished. The practical use of this feature of the invention is made clear by the fact that sewage screenings have a value of 5,000 to 9,000 B. t. u.'s per dry pound and burn readily in suspension.

The sewage solids having been disposed of, the final purification of the liquid is undertaken.

That purification involves the eradication of dissolved solids and colloidal matters and is here accomplished by direct oxidation; in other words, by forcibly impregnating the sewage with air. Impregnation may be substantially instantaneous as provided for in Figs. 31 and 32 or may be of a protracted nature, as shown in Figs. 1 and 2, depending upon the degree of purity demanded in the affluent of the system. A small expenditure of power is involved in the process and the degree of purity attained is measured by the power input, becoming a known effect and quantity.

As about to be described, the aeration process of this invention is practiced by finely subdividing the sewage in air; and, is performed by lifting the liquid from the surface of the moving stream. A cyclonic action is here employed, taking advantage of the surface tensions of air and water and involving the smallest expenditure of power.

Whether aeration be instantaneous or protracted depends upon the duration of the exposure of the liquid to air. The cyclonic action about to be described is so effective as to accomplish an almost perfect instantaneous impregnation of the sewage with air and the process is thus practiced to advantage; but on the other hand, superior advantages are to be gained by the protraction of aeration and is here accomplished by a circulatory action of the liquid.

Cyclonic aeration

This invention has to do with liquids which tend to putrefy, a designation which includes sewage and like organically polluted waters not containing or supplied with enough oxygen to prevent putrefaction.

Filtration and sedimentation may be relied upon to palpably purify organically polluted water but much more is required if water is to be actually reduced to a state of purity. This invention is based upon the conception that final purification can be brought about only through oxidation; in other words, by admixture with air, and the object of the invention is to accomplish a desired degree of oxidation at low cost. Such oxidation may be imposed at any time after the sewage passes the described screen.

The discovery now to be reported is, that while the solubility of oxygen in water is ordinarily regarded as limited to a few parts per million, varying with temperature, it is in fact possible by operations about to be described, to imprison in even very foul water enough air to provide in advance for the firm stabilization thereof and thus afford ample time and means for the chemical and/or the bio-chemical destructive reduction of contained organic matters; thereby protecting any diluting water with which such aerated sewage is admixed; and if desired, even increasing its oxygen content. A great range of aeration is here provided at low cost and whether or not the process shall be carried through to completeness may be freely determined to accord with local sanitary conditions and economic circumstances.

A further discovery hereof is that by a brief atomization of sewage and the use of air in swift motion, it is possible to displace and blow out of sewage quantities of dissolved, imprisoned or entrained gases, vapors, and light organic structures; which, if allowed to remain would militate against prompt and healthful disposal of the main load of organic matters. Next, by abruptly terminating such atomization (restoring the liquid to mass formation) it is possible to charge the purged or air-scrubbed sewage with air in relatively large volume and in the state of minute particles or globules which the massed water thereafter holds in relatively firm imprisonment, suspension or solution, and hence ready for combination with therein adjacent organic matters. These concurrently sequential operations effectively stabilize the sewage; and comprise the gist of the present invention.

Speaking further of the present invention, it may be said to comprise or include the purging and enforced aeration of sewage and the like; and, in contrast with former methods of aerating water en masse, it consists in performing the operations in space and in a state of fine atomization or pulverization within a restricted passage, immediately followed by a consolidation of the liquid. These effects are here attained by the cyclonic operation of swiftly moving air upon the polluted water, comprehending and employing these discoveries in specially invented cyclonic apparatus, all as made clear by Figs. 11 to 20.

However it may arrive at that point, the liquid to be treated has been screened and is supplied or maintained at a level 26, where it is exposed to the open atmosphere. The liquid is lifted from that surface by the force of swiftly whirling air which serves to disintegrate the liquid and expose every part thereof to contact with the air.

The means here provided for the elevation of the liquid comprise a plurality of fixed centrifugal tuyères 27, each having many intake tuyère openings and all served by a suction box 28 which is common thereto. As shown, the suction box is supported above the liquid surface 26, and the bottoms of the tuyères are submerged in the liquid, allowing the liquid to enter freely through the tuyère openings.

The tuyères serve as avenues through which liquid is drawn from the surface 26 and delivered within the box 28. As shown, the suction box is exhausted by a suction fan 29, of which 30 is the exhaust stack. A suction of three inches (of water) here affords an air velocity approximating six thousand feed per minute and proves adequate to break up the water and lift it a much greater distance.

Obviously, the air is drawn through the tuyères at this high velocity but loses velocity within the capacious suction box, allowing the elevated water to sink or settle to the floor 28a of the box. The parts 28' and 28" are collecting surfaces and baffles which intercept particles of water that might otherwise be drawn into the fan.

Figure 32:
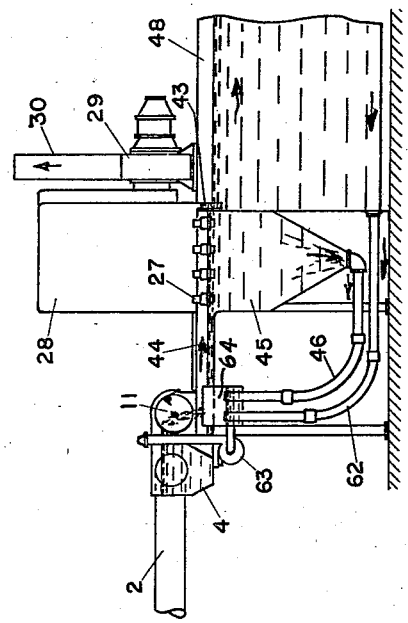
Figure 31:
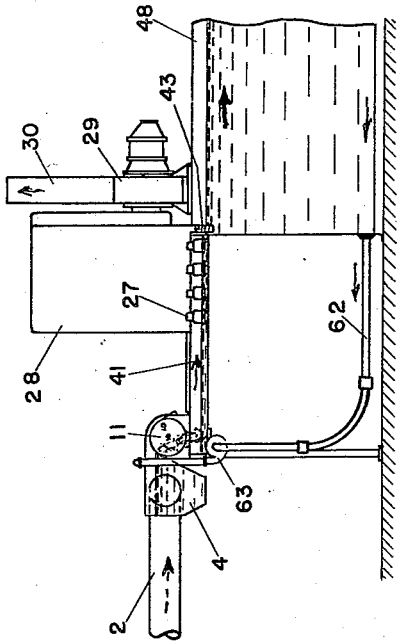
Figure 33:
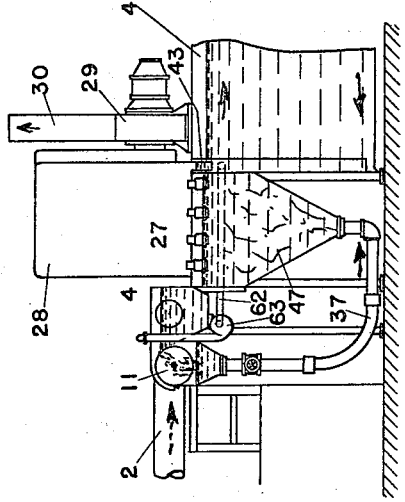

The water which is thus elevated and transferred from the liquid surface 26 to the interior of the suction box may be returned to the surface 26 in a circulatory manner as depicted in Figs. 1 and 2 and elsewhere, or may be collected and moved forward in the stream as shown in Figs. 31, 32 and 33, to which later reference will be made.

It is next important to understand that the centrifugal tuyère, so-called, as here shown, is a device which functions to divide the liquid from the surface 26 into many small streams or films and then to finely disintegrate the liquid within the passing volume of air.

The tuyère 27 is made of metal. It is of cylindrical form, with a closed bottom 31 and an open top 32. The cylindrical wall is sheared and pressed to form a large number of elongated tangential blades 33, which form a like number of tangential intake tuyère openings 34, all having the same direction.

The tangential blades extend from the bottom 31 nearly to the top 32, leaving a blank section 35 above the blades. That section of the tuyère rises through and is fastened in the bottom 28a of the suction box 28. During operation, the air and the liquid enter the tuyère simultaneously. Being directed by the tangential tuyère blades, the air takes on a swift whirling motion within the tuyère and, as a result of such motion, the accompanying liquid is quickly disintegrated and, yielding to the centrifugal forces developed, the disintegrated liquid is spirally whirled upward and expelled through the open top 32 of the tuyère.

Maximum water reception and delivery capacity are secured by forming the tuyère openings large at the bottom, as here shown, freely admitting water to the base of the tuyère. Minimum consumption of air is attained by reducing the width of the tuyère openings for the greater part of the height thereof, which has the effect of restricting the inflow of air through the body of the tuyère while still preserving the energy required to whirl the pulverized liquid and elevate it within the tuyère.

The operation of the tuyère is clearly depicted by Figs. 17 to 20. Fig. 20 illustrates the admission of liquid to the base or bottom of the tuyère. Fig. 19 depicts the whirling disintegrated liquid intermediate the height of the tuyère, showing how the whirling liquid is kept or maintained in and across the path of the entering air. Fig. 18 shows how the liquid having been raised to a point above the tops of the tuyère openings is centrifugally compacted and collected against the imperforate top or neck of the tuyère. Fig. 17 shows how the disintegrated liquid is centrifugally expelled from the top of the tuyère.

The dimension 36 appearing in Fig. 17 represents the pressure drop between the surface 26 and the interior of the suction box. Assuming that difference to be three inches as before mentioned, it will now be apparent that the liquid is elevated not only to the extent necessary to lift it through the higher tuyère but also to a considerable distance into the suction box.

As a result of the disintegration of the liquid within the closely confined whirling stream of air, a high ratio of oxygen is communicated to the water. It is particularly to be noted that the conglomeration of air and liquid particles which takes place within the tuyère is consolidated by the centrifugal collection of the liquid within the imperforate neck portion of the tuyère, just prior to the centrifugal discharge of the liquid from the tuyère. In consequence, the liquid is found to be charged with a quantity of oxygen which is sufficient to freshen and stabilize even stale sewage.

It is now to be noted that the described disintegration of the polluted water in air, appears to explain the pronounced extermination of protozoa, and anaerobic and facultative bacteria, as observed in this operation. Apparently the presence of ample oxygen and the swift change from tensional imprisonment within the water, to sudden freedom upon the surfaces of the water particles, has the effect of bursting or destroying the fragile cells of protozoa, and pathogenic bacteria. The more minute aerobic bacteria in considerable measure escape destruction and may be discharged with the aerated water, thereafter to play their proper part in water purification.

As before stated, the aeration of the liquid may be momentary or may be protracted. By preference, it is protracted as and in the manner shown in Figs. 1 and 2. To that end, the screened sewage, through a duct 37, is delivered to the lower part of a tank or container 38, the volumetric capacity of which ensures retention of the sewage for a measurable time.

The flow is continuous, the liquid leaving the upper part of the tank 38 through an outfall duct 39. As will be understood, the suction fan 29 is in continuous operation and the indraft of air through the tuyères 27 takes place continuously. In this case the liquid from the floor 28a of the suction box returns directly to the tank 38 through the capacious standpipe 40. Thus the liquid from the tank 38 is repeatedly elevated and aerated for as long a time as the liquid remains in the tank 38. Such detention may be several minutes in duration and during that time an abundance of oxygen is disseminated in the liquid, ensuring the freshness and stability of the sewage.

The circulation of the water coupled with the inflow through the duct 37 serves to keep all sewage solids in a state of suspension and a chief result of the aeration described is to charge not only the water but also the sewage solids with particles of oxygen, with consequent assurance of the reduction of those solids by oxidation.

When the screened sewage has been thus forcibly impregnated with air, it is in safe condition for dilution, for it then contains enough oxygen to prevent subsequent putrefaction of organic matters, with little if any dependence upon the oxygen content of the diluting water.

Preference has been expressed for the protracted aeration of the sewage, but on the other hand it is to be understood that the invention is not limited thereto for, as a matter of fact, the cyclonic aeration here described is so efficient that the mere single passage of the liquid through the described centrifugal tuyères is sufficient to stabilize sewage.

In contrast with the circulatory aeration above described, Fig. 31 illustrates the invention as practiced in a continuous manner. The sewage from the screen 11 is conducted to the aerating tuyères 27 through a trough-like channel 41. The liquid is elevated from the trough 41 and falling within the box 28, escapes through an outfall duct 43. Although aeration is here limited to a single pass or transfer of the liquid it is adequate to stabilize the sewage.

In the structure of Fig. 32 the supply channel 44 is combined with a settling pocket 45. The latter affords time for a precipitation of sewage solids below the aerating tuyères 27 prior to discharge through the outfall 43. Matters which are precipitated in the pocket 45 are discharged through a pipe 46, leading from the bottom thereof and are returned to the screen 11, as will be explained.

It is desirable that the tuyère openings 34 (see Figs. 17 to 20) shall be narrow and shall thus limit the liquid to streams which are in the nature of films and therefore easily disintegrated by the air whirling through the tuyères. The settling pocket 45 is a precaution against screen failure. Coarse matters which might clog the tuyères 34, are settled out in the pocket 45 and are returned for removal by the screen.

Figure 34:
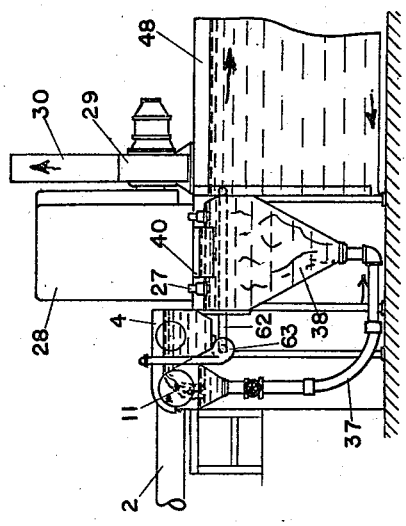

Figs. 33 and 34 respectively represent momentary and protracted aeration methods. The tank 47 (Fig. 33) is employed as a means of distributing the sewage to the many tuyères 27. The latter are of the single-pass arrangement, the aerated liquid being directly transferred to a sedimentation tank.

The Fig. 34 arrangement is identified as of the protracted aeration type, like the structure of Figs. 1, 2, 26 and 27.

Detention

When the sewage has been forcibly aerated as above described, it leaves the aerating or mixing zone through the ducts 39 and is received by and detained in a long trough-like sedimentation tank 48. The cross section of that tank is designed to afford a flow of approximately six inches per minute, the sewage moving from end to end of the tank.

Detention here has two purposes, the first being an allowance of a contact period, during which the oxygen received from the air acts upon the organic matters in the sewage. The second purpose of detention is to allow time for the gravitational separation of the various sewage solids and scums. Matters heavier than water slowly sink to the bottom of the tank. Those which are lighter rise to the surface. Means are here provided for the removal of both settled sludge and floating scum. In practice, a detention of one hour has proven to be adequate for all purposes.

The unitary tank 48 hereof is of novel design and utility and constitutes a new article of manufacture in that it is a self-contained, all metal, and readily transportable unitary part of this sewage treating machine, and like other parts of this machine is adapted to factory production, not limited to construction in the field. It is to be remembered always that the underlying purpose of this invention is to reduce costs and hence this machine as a whole is designed to be produced by methods of highest efficiency and to be of such simplicity that it can be successfully used by the men commonly available for such work, no special skill being required for regulation or control.

As well shown by Figs. 5 to 8 and by Figs. 21 to 25, the metal tank 48 of this invention is an elongated thin walled trough of V-shape cross section, the bottom being formed to facilitate the collection and discharge of sludge. The length of the tank may be ten times its width and, most conveniently, the tank is made of a number of bent plate sections which are united by means of end flanges 49. Each end of the tank comprises a plate 50, which is bolted to the end flanges (see Fig. 23). Rigidity is afforded by top flanges 51 and those flanges may be joined by cross ties. Stability is afforded by the rectangular shapes of the ends 50 and the tank is additionally supported by intermediate cradles 52 (see Fig. 7).

Entering through a distributing duct 53, the screened and aerated sewage progresses slowly toward the end weir 54 and the outfall 3. Sedimentation and levitation occur during the slow movement of the liquid.

It is of particular moment that the described aeration of the sewage is a thorough going operation which has the effect of disengaging soapy matters, grease and oil, ensuring the accumulation thereof upon the surface of the slowly moving stream. In that way the most difficult sewage matters are presented for disposition.

Various devices may be employed for the discharge of the floating scum. The simplest means comprises a cross baffle 55 combined with a trough 55', and, means by which the level of the liquid in the tank may be raised at will, so that the scum may pass into the cross trough. By preference, two baffles and cross troughs are used, one at each end of the tank, and the liquid level is controlled by means of an adjustable end gate 56, positioned at the outfall weir 54. Scums which are discharged through one, the other, or both, of the scum troughs 55' are carried away by a duct 57 which leads to a scum separator 58 adjacent the tank.

Sludges which settle in the V-bottom of the tank are moved endwise therein by an underwater current which is here created for that purpose. A pipe 59 positioned in the lower part of the tank is supplied with water under slight pressure, as through a connection 60. By preference, the pipe is of the V-shaped cross section shown in Fig. 25 and spaced nozzles 61, leading from the interior of the pipe extend downward and backward to direct streams of water against the bottom of the tank. The flow of water from the nozzles is gentle but, being all in one direction, is sufficient to move the sludge particles to the opposite end of the tank. Accumulating at that point, the sludge is discharged through an hydrostatic pipe 62 and it is to be noted that the sludge pipe 62, through the medium of a small pump 63, delivers the sludge to the fine screen 11. It will now be evident that the settled sludge which is recovered in the sedimentation tank is returned to the trash trap and screen. The excess of water is disposed of through the screen and the sludge particles in greater part are intercepted by the screen and are thereby delivered directly to the combustion furnace 24.

Where two or more sludge return pipes (see 46 and 62 of Fig. 32) are employed, a pump sump 64 receives the direct flows of sludge, the pump 63 exhausting the sump and controlling tank levels.

Figs. 1 and 2 by the addition of a second aerator 28x make provision for a terminal aeration of the effluent from the sedimentation tank 48, a measure of importance when a final stage of purification is required.

It is notable that the tuyères illustrated are of a length or height that exceeds the air pressure difference (36) between the bladed exterior and the top of the tuyère. Yet a large volume of liquid is made to rise through the tuyère. This is explained by the fact that the superficial area, the sail area, of the liquid is here tremendously increased and the polluted water is easily swept upward by the moving air. In turn this explains the small consumption of power.

Another noticeable fact concerning this process is this: The collodial matters contained by sewage are observed to be, in considerable measure, brought together or aggregated with one another and with larger sewage particles; and therefore settle more promptly in the sedimentation tank. This is explained by the forcible scrubbing together of the particles, as a part of the described centrifugal behavior of the air and water in the tuyères hereof, particularly those of small diameter.

The importance of the present invention is well illustrated or explained by the results thus far obtained. Raw sewage, merely screened, has been operated upon as herein described and, though carrying a heavy burden of putrescible matter, has remained stable for a period much longer than ever before reported; and most remarkable when it is realized that such stability was imparted in so brief a time of passage, little if any more than one second. The same sewage, when diluted, has remained stable for much longer periods and likewise sewage which has been settled or prepurified.

Furthermore, in these cases the solids have been so far maintained in or restored to a healthful state that they have been avidly eaten by fish with no apparent injury to the fish; and delicate water plants immersed in quantities of thus aerated sewage thrive much as though submerged in potable water.

It is to be noted that the whole process is conducted in open air and at atmospheric temperature.

Because the herein described stabilizing apparatus may be employed in arts other than the treatment of sewage, it is herein claimed as a structure capable of such other uses.

In the foregoing discussion of the treatment of sewage, emphasis has been laid upon the importance of the oxygen which is derivable from air. The nitrogen of air has been virtually disregarded because its part in the chemistry involved is not well defined. Nevertheless, it may be found to play an important part in the stabilization of sewage, either at the instant of application, or at a later time.

Having thus described my invention, I claim as new and desire to secure by Letters Patent:

1. Apparatus for the treatment of organically polluted liquid comprising, in combination, a screen pocket provided with an inlet for polluted liquid and with an outlet, a screen controlling the outlet from said pocket, a treating chamber in communication with the outlet from said pocket and adapted to receive screened liquid therefrom, said treating chamber being provided with an outlet arranged to establish a liquid level in said chamber, a suction box positioned above said treating chamber, means to exhaust said suction box, a fixed centrifugal tuyère extending from below the liquid level established in said treating chamber for discharge into said suction box and a conduit extending from said suction box to a point in said treating chamber below the liquid level established therein.

2. Apparatus for the treatment of organically polluted liquid comprising, in combination, a screen pocket provided with an inlet for the reception of polluted liquid and with an outlet, a rotary screen positioned to control said outlet and arranged to elevate screenings above the level of the stream from said outlet, a furnace, a stack for said furnace, means for removing screenings from said screen at a point remote from the stream from the outlet of said screen pocket and a conduit arranged to lead from adjacent the point of removal of screenings from said screen to said furnace and adapted to receive the screenings as they are removed from said screen and afford a passage therefor to said furnace.

CHARLES GILBERT HAWLEY.